United States Patent
Van Den Berg et al.

(10) Patent No.: US 8,967,888 B2
(45) Date of Patent: Mar. 3, 2015

(54) DRY SILICONE GELS AND THEIR METHODS OF MAKING USING THIOL-ENE CHEMISTRY

(75) Inventors: Otto Van Den Berg, Wilsele (BE); Stephane J. G. Berghmans, Sint-Pauwels (BE); Filip Du Prez, Ghent (BE)

(73) Assignee: Tyco Electronics Raychem BVBA, Kessel-Lo (BE)

( * ) Notice: Subject to any disclaimer, the term of this patent is extended or adjusted under 35 U.S.C. 154(b) by 300 days.

(21) Appl. No.: 13/455,990

(22) Filed: Apr. 25, 2012

(65) Prior Publication Data

US 2013/0287345 A1 Oct. 31, 2013

(51) Int. Cl.
G02B 6/36 (2006.01)
G03G 9/097 (2006.01)

(52) U.S. Cl.
USPC ............................. 385/94; 156/272.2; 522/75

(58) Field of Classification Search
USPC .......................................................... 522/75
See application file for complete search history.

(56) References Cited

U.S. PATENT DOCUMENTS

| | | | |
|---|---|---|---|
| 4,284,539 A | 8/1981 | Homan et al. | |
| 6,451,870 B1 * | 9/2002 | DeCato et al. | 522/99 |
| 7,105,584 B2 * | 9/2006 | Chambers et al. | 522/99 |
| 8,642,891 B2 * | 2/2014 | Berghmans et al. | 174/154 |
| 2004/0209972 A1 | 10/2004 | Chambers et al. | |
| 2012/0320535 A1 * | 12/2012 | Berghmans et al. | 361/728 |
| 2012/0322942 A1 * | 12/2012 | Berghmans et al. | 524/783 |
| 2013/0042973 A1 | 2/2013 | Sakamoto | |
| 2013/0287345 A1 * | 10/2013 | Van Den Berg et al. | 385/94 |

FOREIGN PATENT DOCUMENTS

| | | |
|---|---|---|
| EP | 2565235 A1 | 3/2013 |
| WO | 2011136170 A1 | 3/2011 |
| WO | 2013160252 A2 | 10/2013 |
| WO | 2013160252 A3 | 6/2014 |

OTHER PUBLICATIONS

M. Uygun, M.A. Tasdelen, Y. Yagci, "Influence of Type of Initiation on Thiol-Ene "Click" Chemistry", *Macromol. Chem. Phys.*, 211, pp. 103-110 (2010).

(Continued)

*Primary Examiner* — Rhonda Peace
(74) *Attorney, Agent, or Firm* — Merchant & Gould PC

(57) ABSTRACT

Methods and systems are provided for a dry silicone gel. The dry silicone gel comprises a base polymer having a vinyl-silicone group and a crosslinker having thiol groups. The dry silicone gel may be made without the use of a catalyst by reacting the base polymer and crosslinker in the presence of a photo or thermal initiator. In some embodiments, the gel also comprises a chain extender having thiol groups. In certain embodiments, the dry silicone gel may comprise: (1) a hardness between 100 g and 300 g, (2) a stress relaxation between 30% and 60% when subjected to a deformation of 50% of the original size of the gel, (3) a compression set between 4% and 20% after 50% strain has been applied to the gel for 1000 hours at 70° C., and/or (4) less than 10% oil bleed out under compression of 1.2 atm after 60 days at 60° C.

33 Claims, 12 Drawing Sheets

(56) References Cited

OTHER PUBLICATIONS

S.P.S. Koo, M.M. Stamenovic, R.A. Prasath, A.J. Inglis, F.E. Du Prez, C. Barner-Kowollik, W. van Camp, T. Junkers, "Limitations of Radical Thiol-ene Reactions for Polymer-Polymer Conjugation", *Journal of Polymer Science: Part A: Polymer Chemistry*, vol. 48, pp. 1699-1713 (2010).

International Search Report and Written Opinion mailed May 8, 2014 for related PCT application PCT/EP2013/058298 (WO2013/160252).

\* cited by examiner

DRY SILICONE GELS AND THEIR METHODS OF MAKING USING THIOL-ENE CHEMISTRY

BACKGROUND

Closure systems are used to protect internal components from degradation caused by external environments. For example, internal components such as fiber optic cables and copper cables are often enclosed in closure systems. Examples of commercially available closure systems include the Outdoor Fiber Drop Repair (OFDR), the Outdoor Fiber Distribution Closure (OFDC), and the Fiber optic Infrastructure System Technology (FIST), available from Tyco Electronics, Kessel-Lo, Belgium. In particular, the OFDR Closure is used to break out fibers from a looped fiber optic cable to connect users such as business customers or persons in multiple or single living units. These types of closures can be used in aerial, pedestal, and underground environments. Other closure systems are commercially available for use with communication and energy transmission cables.

Closure systems typically include internal components such as fiber organizers, cable seals and termination devices, drop cable seals for a number of drops with drop cable termination devices, and universal splice holders for a number of splices. These internal components may be subject to environmental factors such as varying moisture levels, heat and cold, and exposure to other chemical substances. The closure systems are preferably protected from damage with a sealant of some sort. Conventional sealants, however, suffer from a number of drawbacks that make them unsuitable for certain closure systems.

Sealants are often used for insulation and for protection against water, corrosion and environmental degradation, and for thermal management. Prior to now, a number of sealants have been known; however, currently available sealants have certain drawbacks and disadvantages that make them inadequate for specific uses and for use in contact with certain materials. In particular, there is an unmet need for sealants that are suitable for fiber optic and electronic closure systems.

Suitable sealing systems for closures are needed for use with a variety of different cables. For examples, a sealing system is needed for cables termed Low Smoke Zero Halogen ("LSZH"), also known as Low Smoke Halogen Free ("LSHF"), Low Smoke Zero Halogen ("LS0H"), and Zero Halogen Low Smoke ("OHLS") among other things.

LSZH cables are characterized by containing no halogenated flame-retardants, and produce relatively limited amounts of smoke when exposed to sources of heat such as a flame or heated wires. LSZH cables provide an alternative to the frequently used polyethylene, PVC, or thermoplastic urethane coatings. Polyethylene, PVC, or thermoplastic urethane, when they contain halogens, may produce hazardous halogen-containing compounds such as HCl or HBr gas. An improvement to current LSZH cable closure systems is needed to enhance performance in environmentally sensitive environments.

Traditionally, thermoplastic oil gels have been used in LSZH closure systems. A problem, however, with thermoplastic gels used as sealants, and in closure systems in general, is that they often contain high amounts of mineral oil. A problem has been observed with oil-containing gels in that they may leak oil. The oil in these gels may leak from the gel and cause deterioration, discoloring, or degradation of the cable in the closure system. In some extreme cases, a cable may even snap under compression due to the damage done by the oil leaking from the thermoplastic gel. There exists an unmet need for alternatives to oil containing gels. Presently available alternatives to oil-containing gels, however, have not provided such a solution. For one, sealants other than oil-containing gels may have one or more undesirable properties. Examples of undesirable properties include excessive hardness, inadequate temperature resistance (e.g., flammability or a tendency to become brittle with cold, i.e., inadequate glass transition temperature) and viscoelastic properties, chemical incompatibility, high water absorption, and hydrolytic instability. Accordingly there exists an unmet need for closure systems with suitable hardness, viscoelastic properties, low permanent set or compression set, long-term performance (e.g., >20 years), amongst other properties.

In contrast to oil-containing thermoplastic gels, dry silicone thermoset gels contain relatively low, or do not contain at all, amounts of diluent fluids such as unreactive silicone oil or mineral oil. A dry silicone gel, instead of being a thermoplastic gel, is a thermoset gel. Thermoset gels can be produced by chemical crosslinking. Examples of thermoset gels are silicone dry gels and polyurethane gels. A dry silicone gel makes no use of an extra solvent or diluent fluid but can still be categorized under the term "gel" because of the similarity in physical properties and behavior, or because of its viscoelastic properties. Dry silicone gels are however used more rarely than free oil-containing gels for a number of reasons. For example, dry silicone gels are rare because they are more expensive and difficult to process than certain other types of gels.

Recent methods of making dry silicone gels have included the use of a catalyst to ensure that the crosslinking reaction takes place. These reactions may be sensitive to poisoning and may make processing of the dry silicone gel harder to control. In these catalytic reaction mechanisms, once the components are mixed, the crosslinking reaction begins. By lowering the temperature, the reaction may be slowed down but will not stop. Inhibitors or moderators may be added to slow down the reaction, but these also may not stop the reaction entirely. Accordingly, there exists an unmet need for an improved dry silicone gel and an improved method of preparing a dry silicone gel.

BRIEF SUMMARY

In one embodiment, a method is provided for making a dry silicone gel by thiol-ene chemistry ("efficient linking chemistry"). The method comprises providing a base polymer having a vinyl-silicone group, a crosslinker having thiol groups, and an initiator. The method further comprises providing heat or ultraviolet (UV) light. The method further comprises reacting the base polymer and crosslinker in the presence of the initiator to form the dry silicone gel.

In some embodiments, the method further comprises providing a chain extender having thiol groups, wherein the base polymer, crosslinker, and chain extender are reacted in the presence of the initiator. In other embodiments, the method further comprises providing at least one additive selected from the group consisting of: flame retardants, coloring agents, adhesion promoters, stabilizers, fillers, dispersants, flow improvers, plasticizers, slip agents, toughening agents, and combinations thereof. In one embodiment, the method further comprises providing between 0.1 wt % and 30 wt % of a toughening agent. In some embodiments, the toughening agent is a fumed silica (e.g., surface-treated hydrophobized fumed silica).

In certain embodiments, the initiator is a photoinitiator or thermal initiator. In one embodiment, the photoinitiator is 2,2-dimethoxy-2-phenylaceto-phenone. In other embodiments, the photoinitiator may be selected from one or more of the following compounds: acetophenone, anisoin, anthraquinone, benzil, benzoin, benzoin ethyl ether, benzoin isobutyl ether, benzoin methyl ether, benzophenone, benzophenone/1-hydroxycyclohexyl phenyl ketone (50/50 blend), 3,3',4,4'-benzophenonetetracarboxylic dianhydride, benzoylbiphenyl, 2-benzyl-2-(dimethylamino)-4'-morpholinobutyrophenone, 4,4'-bis(diethylamino)benzophenone, 4,4'-bis(dimethylamino)benzophenone, camphorquinone, 2-chlorothioxanthen-9-one, dibenzosuberenone, 2,2-diethoxyacetophenone, 4,4'-dihydroxybenzophenone, 4-(dimethylamino)benzophenone, 4,4'-dimethylbenzil, 2,5-dimethylbenzophenone, 3,4-dimethylbenzophenone, diphenyl(2,4,6-trimethylbenzoyl) phosphine oxide/2-hydroxy-2-methylpropiophenone (50/50 blend), 4'-ethoxyacetophenone, 2-ethylanthraquinone, 3 3'-hydroxyacetophenone, 4 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methybenzoylformate, 2-methyl-4'-(methylthio)-2-morpholinopropiophenone, phenanthrenequinone, 4'-phenoxyacetophenone (98%), and thioxanthen-9-one.

In other embodiments, the thermal initiator is a peroxide or azo-compound. In some embodiments, the thermal initiator is selected from the group consisting of, 2,2'-azobisisobutyronitrile (AIBN), cyclohexyl analogs of AIBN, 2,2'-azobis(4-methoxy-2,4-dimethyl valeronitrile) (V70), and mixtures thereof.

In certain embodiments, the crosslinker is a polydimethylsiloxane (PDMS) copolymer having a thiol content between 0.1 mmol/g and 10 mmol/g and a molecular weight between 2000 g/mol and 20000 g/mol. In some embodiments, the crosslinker is a (mercaptopropyl) methylsiloxane-dimethylsiloxane copolymer. In some embodiments, the chain extender is a thiol end-capped PDMS or a thio-functional telechelic PDMS.

In some embodiments, the base polymer comprises a vinyl-terminated polydimethylsiloxane. The base polymer may have one or more of the following properties: (a) a molecular weight between 5,000 g/mol and 70,000 g/mol; (b) a viscosity between 100 mm$^2$/s and 165,000 mm$^2$/s; and (c) a vinyl content between 0.01 mmol/g and 0.1 mmol/g.

In certain embodiments, the dry silicone gel comprises one or more of the following properties: (a) a hardness between 100 g and 300 g; (b) a stress relaxation between 40% and 60% when the gel is subjected to a deformation of 50% of its original size; (c) a compression set between 4% and 20% after 50% strain has applied to the gel for 1000 hours at 70° C.; and (d) less than 10% oil bleed out after being under compression of 1.2 atm for 60 days at 60° C.

In another embodiment, a method is provided for making a dry silicone gel by thiol-ene chemistry. The method comprises providing a vinyl-terminated polydimethylsiloxane having a molecular weight between 28,000 g/mol and 70,000 g/mol, a viscosity between 3,000 mm$^2$/s and 7,000 mm$^2$/s, and a vinyl content between 0.01 mmol/g and 0.1 mmol/g. The method further comprises providing a crosslinker having a thiol content between 0.1 mmol/g and 10 mmol/g and a molecular weight between 2000 g/mol and 20000 g/mol. The method further comprises providing a chain extender. The method further comprises providing a photo or thermal initiator. The method further comprises providing a fumed silica hardening agent. The method further comprises providing heat or UV light. The method further comprises reacting the base polymer, crosslinker, and chain extender in the presence of the initiator to form the dry silicone gel.

In another embodiment, a dry silicone gel composition is provided. The dry silicone gel comprises 45-99.99 wt % of a base polymer having a vinyl-silicone group. The gel further comprises 0.01-5 wt % of a crosslinker having thiol groups. The gel further comprises 0-50 wt % of a chain extender having thiol groups. In some embodiments, the dry silicone gel composition comprises between 90-99.9 wt % base polymer, 0.1-5 wt % crosslinker, and 0.01-5 wt % chain extender. In some embodiments, the gel further comprises at least one additive selected from the group consisting of: flame retardants, coloring agents, adhesion promoters, stabilizers, fillers, dispersants, flow improvers, plasticizers, slip agents, toughening agents, and combinations thereof. In one embodiment, the gel further comprises between 0.1 wt % and 30 wt % of a toughening agent. In some embodiments, the toughening agent is a fumed silica. In certain embodiments, the dry silicone gel comprises one or more of the following properties: (a) a hardness between 100 g and 300 g; (b) a stress relaxation between 40% and 60% when the gel is subjected to a deformation of 50% of its original size; (c) a compression set between 4% and 20% after 50% strain has applied to the gel for 1000 hours at 70° C.; and (d) less than 10% oil bleed out after being under compression of 1.2 atm for 60 days at 60° C.

In certain embodiments, the base polymer is a vinyl-terminated polydimethylsiloxane. The base polymer may have one or more of the following properties: (a) a molecular weight between 5,000 g/mol and 70,000 g/mol; (b) a viscosity between 100 mm$^2$/s and 165,000 mm$^2$/s; and (c) a vinyl content between 0.01 mmol/g and 0.1 mmol/g. In some embodiments, the crosslinker is a (mercaptopropyl) methylsiloxane-dimethylsiloxane copolymer having a thiol content between 0.1 mmol/g and 10 mmol/g and a molecular weight between 2,000 g/mol and 20,000 g/mol. In other embodiments, the chain extender is a thiol end-capped PDMS or a thio-functional telechelic PDMS.

In yet another embodiment, a closure system including a dry silicone gel is provided. The closure or interconnect system comprises a housing, a cable, and the dry silicone gel. The dry silicone gel in the system is made by thiol-ene chemistry through the reaction of a crosslinker having thiol groups, a chain extender having thiol groups, and a base polymer having a vinyl-silicone group together in the presence of an initiator.

In some embodiments, the system further comprises a connector and receptacle for the connector. In certain embodiments, the cable in the system is an LSZH cable, and the gel is compatible with the LSZH cable as determined by a pressure loss test or tightness test following at least one of the following mechanical or environmental tests: axial tension test, flexure test, re-entry test, torsion test, resistance to aggressive media test, resistance to stress cracking test, salt fog test, temperature cycling test, and waterhead test.

In certain embodiments, the dry silicone gel has a hardness between 100 g and 300 g (26-53 Shore 000 Hardness), or between 160 g and 220 g (37-45 Shore 000). In some embodiments, the dry silicone gel has an original size and a stress relaxation between 30% and 60%, or between 40% and 60% when subjected to a deformation of 50% of the original size. In other embodiments, the dry silicone gel has a compression set between 4% and 20%, or between 10% and 14% after 50% strain has been applied to the gel for 1000 hours at 70° C. In certain embodiments, the dry silicone gel has less than 10% oil bleed out under compression of 1.2 atm after 60 days at 60° C.

DETAILED DESCRIPTION

Figure 1:
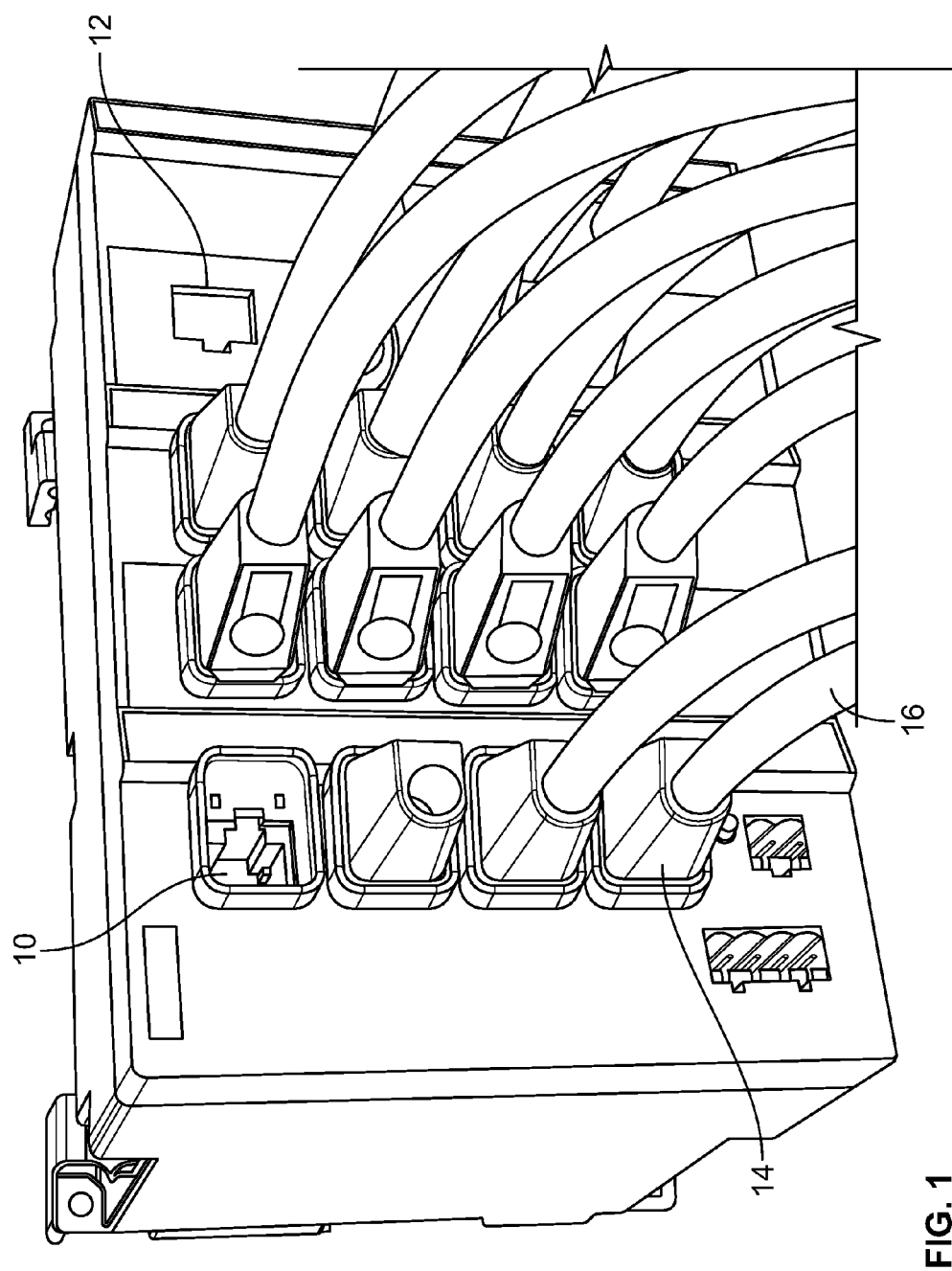
FIG. 1 is a depiction of an interconnect system having a connection hub having multiple connection ports or receptacles for the connector, housing, and cable components to be connected.

As used herein, terms such as "typically" are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

As used herein, the terms "comprise(s)," "include(s)," "having," "has," "contain(s)," and variants thereof, are intended to be open-ended transitional phrases, terms, or words that do not preclude the possibility of additional acts or structure.

Any concentration range, percentage range, or ratio range recited herein are to be understood to include concentrations, percentages, or ratios of any integer within that range and fractions thereof, such as one tenth and one hundredth of an integer, unless otherwise indicated. Also, any number range recited herein relating to any physical feature are to be understood to include any integer within the recited range, unless otherwise indicated. It should be understood that the terms "a" and "an" as used above and elsewhere herein refer to "one or more" of the enumerated components. For example, "a" polymer refers to one polymer or a mixture comprising two or more polymers.

As used herein, the term "dry silicone gel" may refer to a chemically crosslinked polymer having a Si—O backbone and comprising a relatively low amount, or no amount at all, of diluent fluids such as silicone oil or mineral oil. As opposed to carbon-based polymers, the crosslinked silicone polymers of dry silicone gels are based on a Si—O backbone. The characteristics of silicon and oxygen provide crosslinked polymers with their exceptional properties. For example, silicon forms stable tetrahedral structures, and silicon-oxygen bonds are relatively strong which results in dry silicone gels with high temperature resistance. In addition, crosslinked Si—O polymers have a relatively high chain flexibility as well as low rotational energy barrier.

In certain embodiments, the dry silicone gel is made through the reaction of a base polymer having a Si-vinyl group with a thiol crosslinker and a thiol chain extender in the presence of an initiator. The dry silicone gel is formed through a thiol-ene chemistry reaction mechanism. These thiol-ene reactions can be induced photochemically or thermally without undesirable side reactions such as sulfenyl radical coupling.

A generalized mechanism of the radical addition thiol-ene reaction is shown below. In the first step (initiation, k1), the initiator radical abstracts a hydrogen atom from a thiol molecule. The thio-radical then adds to the carbon double bond (k2), forming the highest substituted carbon-centered radical, which in turn abstracts a proton from a second thiol molecule (k3). The cycle then continues with the addition of the thio-radical to a second ene molecule (k2), etc. Termination (k4) takes place mainly by radical-radical recombination reactions leading to the formation of small amounts of mainly disulfide side-products.

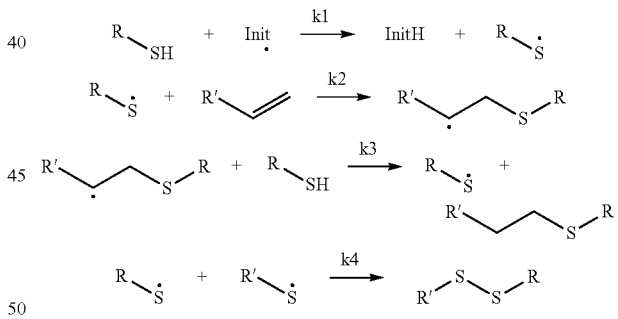

Through the use of thiol-ene chemistry, this reaction mechanism avoids use of catalysts that may poison the system or make it less stable. These reactions can be considered environmentally friendly, as they may proceed in the absence of a solvent and without the use of any potentially toxic metal. Furthermore, in the thiol-ene chemistry reaction mechanism, the components will not react and crosslink until the initiator is triggered. This may make the dry silicone gel easier and faster to process. In particular, the hardness, stress relaxation, and/or compression set properties of the silicone gel may be more readily controlled through the thiol-ene chemistry reaction mechanism than catalytic reaction mechanisms.

A schematic overview of the dry silicone gel formed through a thiol-ene chemistry reaction mechanism is depicted in (I) below, wherein the crosslinker compounds are represented by "+", "T", and "*" the chain extender compounds are represented by "=," and the base polymer compounds are represented by "—." In certain embodiments, the chain extender must always connect two different base polymer compounds, or connect to one base polymer and terminate the chain on the opposite end.

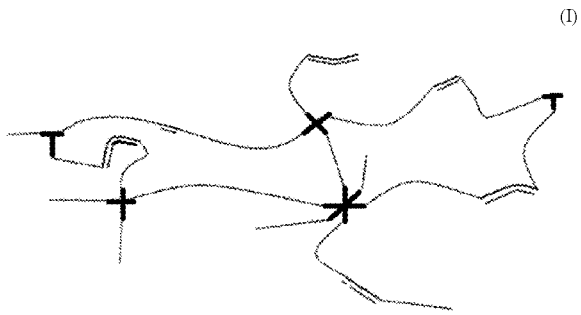

(I)

Base Polymer

In certain embodiments, the Si-vinyl base polymer is a vinyl terminated polydimethylsiloxane (otherwise referred to as "V-PDMS"), which is shown below in (II). In this example, the base polymer compound comprises a vinyl group at each end of the compound.

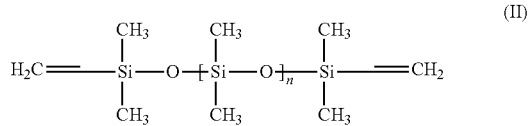

(II)

In certain embodiments, the molecular weight of the base polymer is controlled through anionic ring-opening polymerization of cyclic siloxanes in the presence of alkali-metal hydroxide of a base that is volatile (e.g., tetramethylammonium silanolate). Endcapping of the PDMS with a vinyl group is needed, so these groups are added to the polymerization mixture. V-PDMS together with the chain extender determine the molecular weight between the different crosslink sites.

The vinyl-containing base polymer, such as V-PDMS, may have different viscosities that affect the resulting dry silicone gel. In general, a high molecular weight V-PDMS will yield a pre-cure formulation with a higher viscosity. In certain embodiments, a low molecular weight V-PDMS generally improves processability. In other embodiments, the V-PDMS used in the dry silicone gel has a viscosity between approximately 100 and 165,000 cSt (100-165,000 mm$^2$/s), between approximately 1000 cSt and 50,000 cSt (1000-50,000 mm$^2$/s), between approximately 3000 cSt and 7000 cSt (3000-7000 mm$^2$/s), or between approximately 4500 cSt and 5500 cSt (4500-5500 mm$^2$/s).

In some embodiments, the vinyl-terminated polydimethylsiloxane has a molecular weight between about 5,000 g/mol and about 80,000 g/mol. In other embodiments, the vinyl-terminated polydimethylsiloxane has a molecular weight between about 50,000 g/mol and about 80,000 g/mol. In yet other embodiments, the vinyl-terminated polydimethylsiloxane has a molecular weight between about 28,000 g/mol and about 72,000 g/mol. In one particular embodiment, the vinyl-terminated polydimethylsiloxane has a molecular weight of approximately 49,500 g/mol.

In certain embodiments, the base polymer contains between approximately 1 and 10 mol of vinyl per 500,000 g/mol of V-PDMS. In one embodiment, the base polymer contains approximately 2 mol of vinyl per 200,000 g/mol of V-PDMS (the vinyl end group concentration would be in the order of $10^{-5}$). In yet other embodiments, the vinyl content of the V-PDMS is between approximately 0.01 and 0.1 mmol/g, or between approximately 0.036 and 0.07 mmol/g.

Crosslinker

In certain embodiments, the thiol functionality for the thiol-ene reaction may be provided by a crosslinker and/or a chain extender. The crosslinker and chain extender are capable of forming connections between vinyl-terminated polydimethylsiloxane chains. In certain embodiments, the crosslinker comprises functional S—H groups that are compatible and willing to react with the vinyl groups in the base polymer. The crosslinker may include two or more S—H groups. In certain embodiments, the crosslinker comprises between three and ten S—H groups that are capable of forming a connection point between three and ten different vinyl-terminated polydimethylsiloxane chains, such that the crosslinker functions as a branching agent. In another embodiment, the crosslinker comprises four S—H groups that are capable of forming a connection point between four different vinyl-terminated polydimethylsiloxane chains. In yet other embodiments, the crosslinker can function as a chain extender. In some embodiments, the crosslinker is a thio functional PDMS copolymer. In one embodiment, the crosslinker is a thiopropyl functionalized PDMS copolymer.

Chain Extender

In addition to the crosslinker, the thiol functionality for the thiol-ene reaction may be provided by a chain extender. In certain embodiments, the chain extender comprises functional groups that are compatible and willing to react with the vinyl groups in the base polymer. The chain extender typically includes two S—H groups, wherein both ends of the chain extender compound are terminated with S—H groups.

The chain extender may be any chain extender known in the art. In certain embodiments, the chain extender is a thiol end-capped PDMS or a thio-functional telechelic PDMS. In some embodiments, the chain extender is prepared through an equilibrium polymerization of cyclic oligomers. In one embodiment, the thiol-functional telechelic PDMS is prepared from an aliphatic dithiol such as ethane dithiol or propane dithiol.

In certain embodiments, by making use of the chain extender molecule, the V-PDMS base polymer can be shorter because the chain extender will extend the V-PDMS base polymer chain in situ between two crosslinker compounds. By using this mechanism, a V-PDMS chain of a shorter length can be applied which leads to lower viscosities and compounds that are easier to work with. Therefore, lower viscosity base polymer compounds can be used unlike a peroxide activated cure reaction mechanism. For example, a peroxide activated cure mechanism makes use of polymer chains with viscosities of approximately 2,000,000 cSt (2,000,000 mm$^2$/s) while the thiol-ene reaction mechanism allows for base polymer chains (V-PDMS) having viscosities of approximately 5,000 cSt (5,000 mm$^2$/s).

Initiator

In certain embodiments, the thiol-ene chemistry reaction is carried out in the presence of an initiator. The initiator may be a thermal initiator. In certain embodiments, the thermal initiator is a peroxide, azo-compound, or mixture thereof. In some embodiments, the thermal initiator is an azo-compound selected from the group consisting of 2,2'-azobisisobutyronitrile (AIBN), cyclohexyl analogs of AIBN, 2,2'-azobis(4- methoxy-2,4-dimethyl valeronitrile) ("V70"), and mixtures thereof. In other embodiments, the peroxide is a sterically hindered peroxide.

In certain embodiments, the initiator is a photoinitiator. The photoinitiator may be a cleavage type (Type I) photoinitiator such as 2,2-dimethoxy-2-phenylaceto-phenone (DMPA) or (2,4,6-trimethylbenzoyl)diphenylphosphine oxide (TMDPO). Additionally, the photoinitiator may be a H-abstraction type (Type II) photoinitiator such as benzophenone (BP), thioxanthone (TX), or camphorquinone (CQ). In other embodiments, the photoinitiator may be selected from one or more of the following compounds: acetophenone, anisoin, anthraquinone, benzil, benzoin, benzoin ethyl ether, benzoin isobutyl ether, benzoin methyl ether, benzophenone, benzophenone/1-hydroxycyclohexyl phenyl ketone (50/50 blend), 3,3',4,4'-benzophenonetetracarboxylic dianhydride, benzoylbiphenyl, 2-benzyl-2-(dimethylamino)-4'-morpholinobutyrophenone, 4,4'-bis(diethylamino)benzophenone, 4,4'-bis(dimethylamino)benzophenone, camphorquinone, 2-chlorothioxanthen-9-one, dibenzosuberenone, 2,2-diethoxyacetophenone, 4,4'-dihydroxybenzophenone, 4-(dimethylamino)benzophenone, 4,4'-dimethylbenzil, 2,5-dimethylbenzophenone, 3,4-dimethylbenzophenone, diphenyl(2,4,6-trimethylbenzoyl) phosphine oxide/2-hydroxy-2-methylpropiophenone (50/50 blend), 4'-ethoxyacetophenone, 2-ethylanthraquinone, 3 3'-hydroxyacetophenone, 4 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methylbenzoylformate, 2-methyl-4'-(methylthio)-2-morpholinopropiophenone, phenanthrenequinone, 4'-phenoxyacetophenone (98%), and thioxanthen-9-one. In certain embodiments, DMPA provides a high extinction coefficient (surface cure), good solubility in PDMS, a fast cure (seconds), and good gel properties.

Additives

In certain embodiments, the dry silicone gel composition may comprise additional components. For example, the dry silicone gel composition may include additives such as flame retardants, coloring agents, adhesion promoters, stabilizers, fillers, dispersants, flow improvers, plasticizers, slip agents, toughening agents, and combinations thereof.

In certain embodiments, the dry silicone gel composition comprises a toughening agent that may improve the ability for the composition to deform without breaking. In some embodiments, the toughening agent may allow the composition to be strained to approximately 800%, 1000%, or 1200% of its original size before breaking.

In certain embodiments, the toughening agent is a fumed silica. In certain embodiments, the fumed silica comprises between 0.1-30 wt % of the overall composition, 1-25 wt % of the overall composition, or 5-20 wt % of the overall composition. In some embodiments, the fumed silica is a surface-treated hydrophobized fumed silica. In one embodiment, the fumed silica is a hexamethyldisilazane treated fumed silica. One non-limiting example of a fumed silica that may be used in the dry silicone gel composition is AEROSIL® R9200 modified, hydrophobic fumed silica, available from Evonik Degussa Corp. (Parsippany, N.J., USA).

In certain embodiments, the additional additives may include at least one material selected from the group consisting of Dynasylan 40, PDM 1922, Songnox 1024, Kingnox 76, DHT-4A, Kingsorb, pigment, and mixtures thereof. In some embodiments, the additives comprise between 0.1 and 25 wt % of the overall composition, between 0.1 and 5 wt % of the overall composition, between 0.1 and 2 wt % of the overall composition, or between 0.1 and 1 wt % of the overall composition.

In some embodiments, the compositions disclosed and by methods disclosed herein comprise a flame retardant. In certain embodiments, the flame retardant is zinc oxide. In some embodiments, the flame retardant comprises between 0.1 and 25 wt % of the overall composition, between 0.1 and 5 wt % of the overall composition, between 0.1 and 2 wt % of the overall composition, or between 0.1 and 1 wt % of the overall composition. In one embodiment, the flame retardant comprises 20 wt % of the overall gel composition.

In some embodiments, the compositions disclosed and made by methods disclosed herein contain at least one stabilizer. Stabilizers include antioxidants, acid-scavengers, light and UV absorbers/stabilizers, heat stabilizers, metal deactivators, free radical scavengers, carbon black, and antifungal agents.

Making the Dry Silicone Gel

In certain embodiments, the dry silicone gel is prepared by mixing between 45-99.99 wt % base polymer, 0.01-5 wt % crosslinker, and 0-50 wt % chain extender together at room temperature (25° C.). In some embodiments, the dry silicone gel is prepared by mixing between 90-99.9 wt % base polymer, 0.1-5 wt % crosslinker, and 0.01-5 wt % chain extender together. In other embodiments, the dry silicone gel is prepared by mixing between 95-99.9 wt % base polymer, 0.05-2 wt % crosslinker, and 0.1-3 wt % chain extender together. In yet other embodiments, the dry silicone gel is prepared by mixing between 98.5-99.5 wt % base polymer, 0.1-0.5 wt % crosslinker, and 0.1-1 wt % chain extender together.

In certain embodiments, an additive or additives may also be added to the base polymer, crosslinker, and chain extender. In certain embodiments, the additive may comprise between 1-30 wt % of the overall composition, 1-25 wt % of the overall composition, or 5-20 wt % of the overall composition An initiator may be added to the dry silicone gel components. In certain embodiments, approximately 0.001-10 parts by weight, 0.05-5 parts by weight, or 0.1-1 parts by weight initiator can be blended with the dry silicone gel components (base polymer, crosslinker, and chain extender).

When the initiator is a thermal initiator, the thiol-ene chemistry reaction mechanism is triggered by the addition of heat. In some embodiments, the dry silicone gel components are heated to 50° C.-100° C., 70-90° C., or 75-85° C. and held at temperature for 1-12 hours, 2-8 hours, or 3-6 hours. In other embodiments, the thermal initiator, such as V70, may be triggered at or near room temperature (25° C.). The temperature and time at temperature may be adjusted accordingly to target the end properties desired in the dry silicone gel. Several of those properties are discussed in the section below labeled "Uses and Properties of the Dry Silicone Gel."

When the initiator is a photoinitiator, the thiol-ene chemistry reaction mechanism is triggered by the addition of ultraviolet (UV) light. In certain embodiments, the wavelength of the UV light is between 10-500 nm, 200-400 nm, or 300-400 nm. The light intensity of the UV light may be between 0.1-20 mW/cm$^2$, 0.5-10 mW/cm$^2$, or 1-5 mW/cm$^2$. In certain embodiments, the temperature for the reaction mechanism is approximately room temperature (25° C.). The wavelength and intensity of the UV light may be adjusted accordingly to target the end properties desired in the dry silicone gel. In certain embodiments, the photoinitiator is added into a solution of diethylether. Preferably, only a minimal amount of solvent is needed to dissolve the material (e.g., usually less than 0.2% by weight of the total formulation). In some embodiments, before application to the mold, high-vacuum (~0.1 Torr) is applied to remove the small amount of solvent (e.g., ether) together with any air bubbles trapped in the formulation.

Several of those properties are discussed in the section below labeled "Uses and Properties of the Dry Silicone Gel."

Uses and Properties of the Dry Silicone Gel

The dry silicone gels described herein may be used in a number of end uses due to their improved properties, such as improved behavior in mechanical stresses (e.g., vibration and shock) or ability to seal uneven or complicated structures (due to the ability to flow and adapt to the area of the structure). In certain embodiments, the dry silicone gels may be used in an interconnect, cover, or closure system. In particular, the dry silicone gel may be used in a fiber optic closure, electrical sealant, or electrical closure. In some embodiments, the dry silicone gels are used as gel wraps, clamshells, or gel caps. In further embodiments, the dry silicone gels are used in the inside of a residence. In other embodiments, the dry silicone gels are used outside of a residence. Use of the dry silicone gel within a closure or interconnect system may allow for a reduction in the number of components, frame size, or cost over other sealing mechanisms.

In certain embodiments, the dry silicone gel is used as a flame retardant sealant. In one embodiment, the dry silicone gel comprises a flame retardant additive (e.g., zinc oxide) in order to function as a flame retardant sealant.

In certain embodiments, the dry silicone gel is used in a closure system. In certain embodiments, the closure system comprises a housing, a cable, and a dry silicone gel. In some embodiments, the cable is a LSZH cable.

In some embodiment, the system further comprises a connector, and, in some instances, a receptacle or port, therein forming an interconnect system. The interconnect system may comprise a mini input/output connector, data connector, power connector, fiber optic connector, or combination thereof. For example, the interconnect system may comprise a RJ-45 connector system. Non-limiting examples of interconnect systems and components are displayed in FIGS. 1, 2, 3, 4*a*, 4*b*, 5*a*, and 5*b*.

The dry silicone gel may be used to create a seal formed by displacement. In other embodiments, the dry silicone gel may be used to create a seal having radial functionality, axial functionality, or a combination thereof. In yet other embodiments, the dry silicone gel may be used to create a seal formed by displacement and having radial and/or axial functionality.

Figure 2:
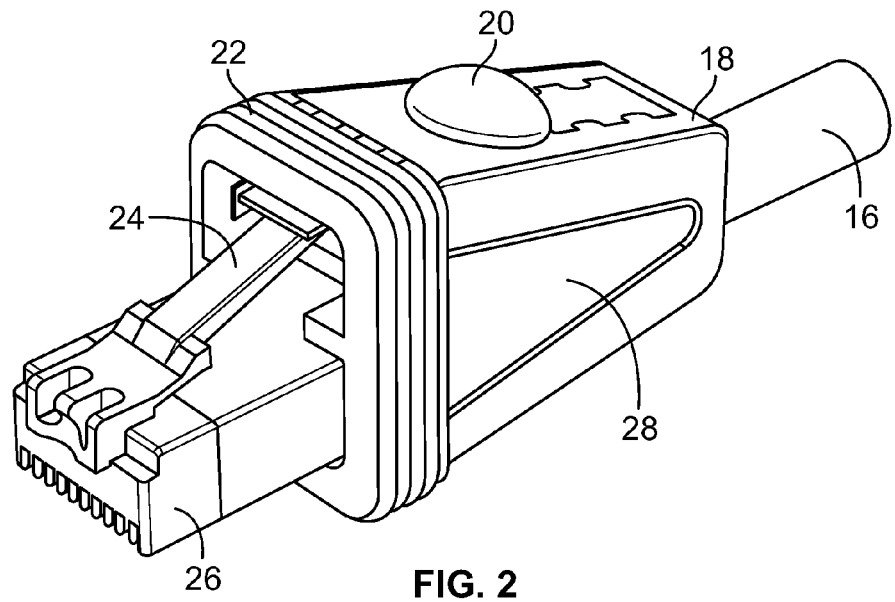
FIG. 2 is a depiction of a connector, housing, and cable assembly with radial sealing.
Figure 3:
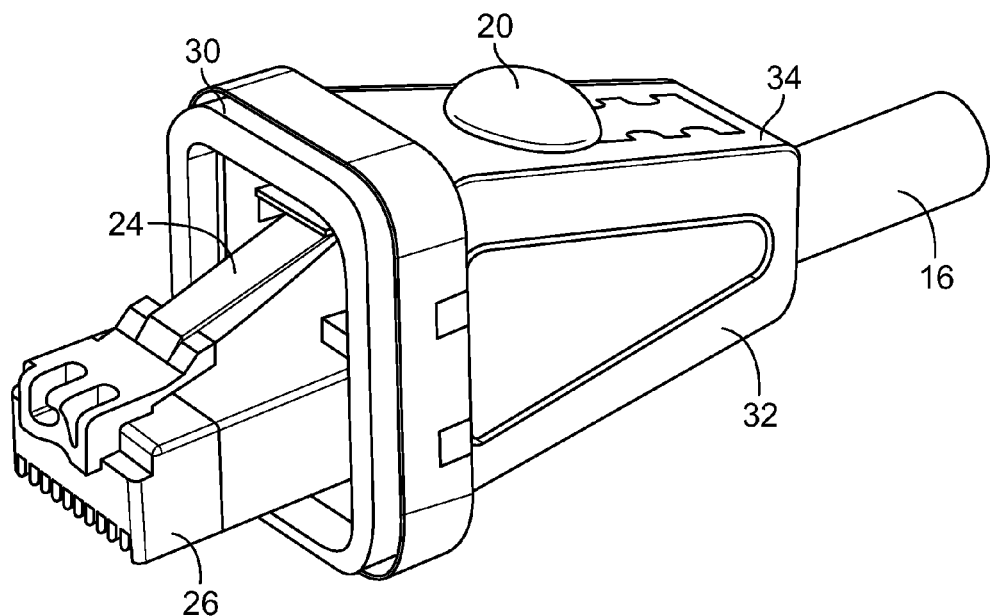
FIG. 3 is a depiction of a connector, housing, and cable assembly with axial sealing.

FIGS. 1, 2, and 3 provide non-limiting examples of radial and axial functionality. FIG. 1 displays an example of a connection hub having multiple connection receptacles or ports for the cables 16 within the housings 14 to be connected. FIG. 1 displays both radial connection ports 10 and axial connection ports 12. FIG. 2 displays a connector 26; housing 18, 28; and cable 16 assembly with radial sealing 22. FIG. 3 displays a connector 26; housing 32, 34; and cable 16 assembly with axial sealing 30, wherein the seal follows the surface of the axial port 12. In certain embodiments, the housing may have a knob 20 that may be pushed inward to engage the latch 24 on the connector 26, allowing the connector to be removed from the port.

Figure 4A:
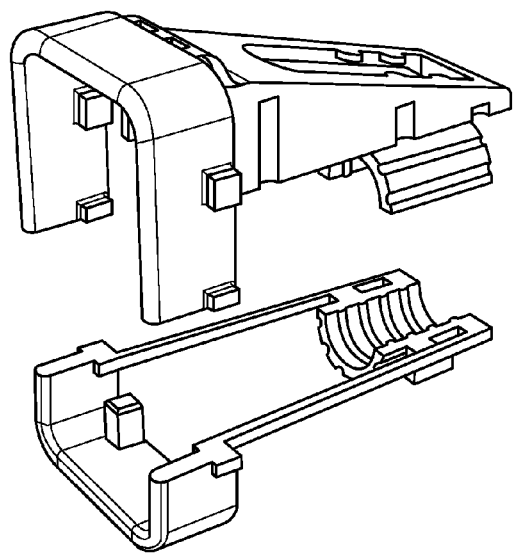
FIGS. 4a and 4b are depictions of a straight two piece housing assembly designed for axial sealing.
Figure 4B:
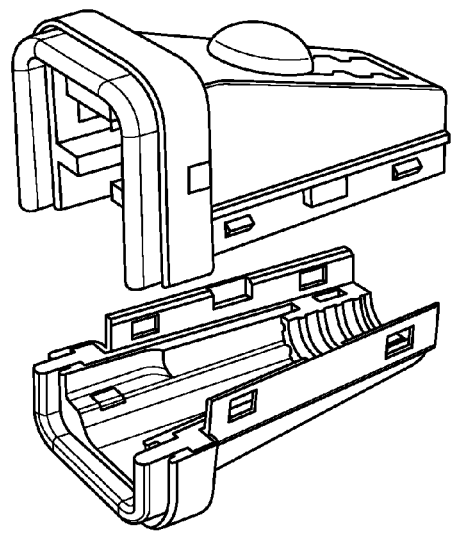
Figure 5A:
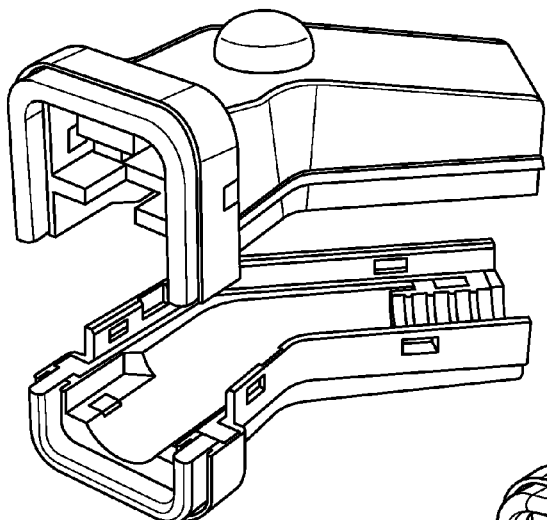
FIGS. 5a and 5b are depictions of an angled two piece housing assembly designed for axial sealing.
Figure 5B:
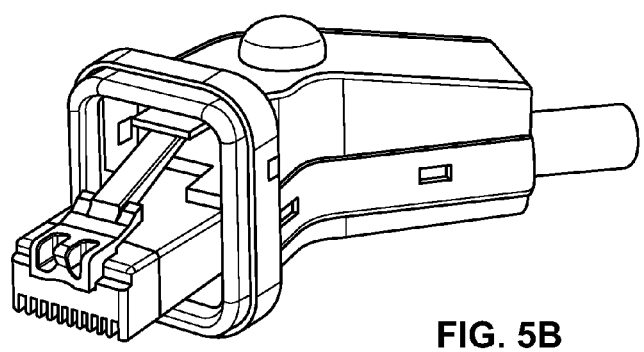
Figure 6:
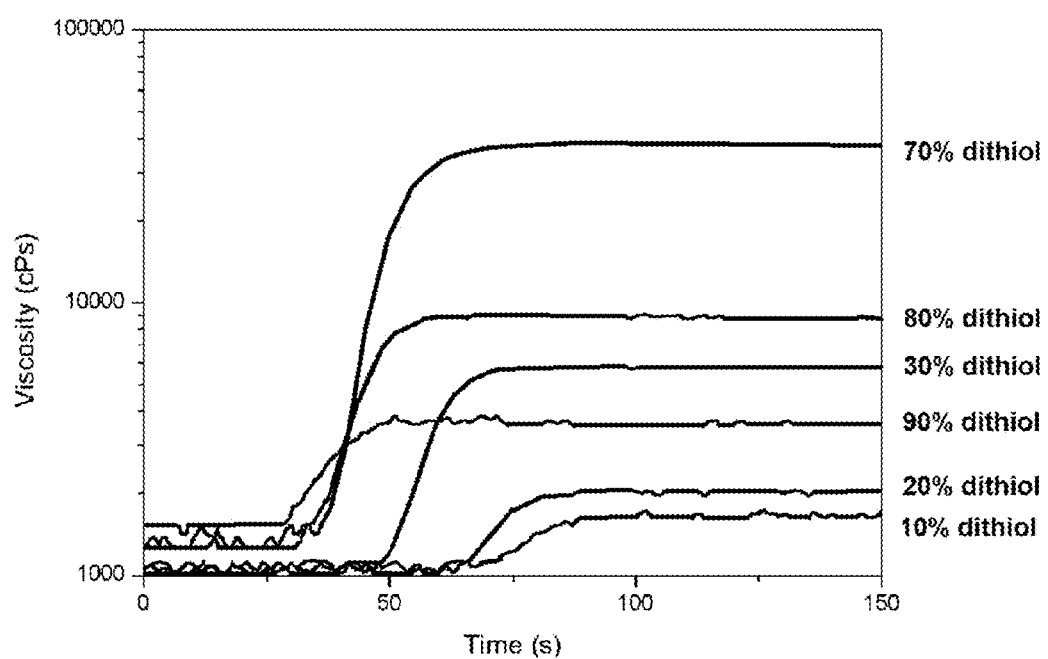
FIG. 6 is a depiction of the viscosity of the dry silicone gel for different ratios of dithio-functional PDMS to divinyl PDMS as a function of irradiation time.

In certain embodiments, the dry silicone gel may be used to create a seal in a housing assembly having multiple parts. For example, in one embodiment the dry silicone gel may be used in a straight two-piece housing assembly, as shown in FIGS. 4*a* and 4*b*. In another embodiment, the dry silicone gel may be used in an angled two-piece housing assembly, as shown in FIGS. 5*a* and 5*b*.

The dry silicone gel may be sealed around the cable 16 by sliding a smaller diameter gel formation over the cable to create a seal through interference. In other embodiments, the seal may be created by molding the dry silicone gel around the inside of the housing components and then snapping the housing, gel, and cable into place.

In some embodiments, the dry silicone gel is used in a closure or interconnect system that is "compatible" with a low smoke zero halogen (LSZH) cable. In certain embodiments, compatibility is measured by subjecting the sample to one or more mechanical or environmental tests to test for certain functional requirements. In some embodiments, compatibility is measured by passing a pressure loss test, tightness test, and/or visual appearance test. In certain embodiments, the dry silicone gel in the closure or interconnect system is compatible where a traditional thermoplastic elastomer gel would fail (as shown and described in the examples and figures).

Tightness may be tested under International Electrotechnical Commission (IEC) Test 61300-2-38, Method A and IEC 60068-2-17, Test Qc. In certain embodiments, tightness is tested by immersing the specimen in a water bath and using an internal pressure of 20-40 kPa (0.2-0.4 atm) for 15 minutes. It is important that tightness is measured directly after installing the closure at a temperature of −15° C. or 45° C. It is also important that all the air bubbles present on the outside of the closure are removed. If a continuous stream of air bubbles is observed, this means the specimen is not properly sealed and it will be considered as a failure (i.e., not compatible).

Pressure loss may be tested under IEC 61300-2-38, Method B. In certain embodiments, the gel and cable are compatible if the difference in pressure before and after the test is less than 2 kPa (0.02 atm).

Visual appearance may be tested under IEC 61330-3-1 by examination of the product with the naked eye for defects that could adversely affect the product performance.

The sample may be subjected to various mechanical and/or environmental conditions prior to testing tightness, pressure loss, visual appearance, etc. In certain embodiments, compatibility is determined by subjecting the sample to one or more of the following mechanical tests: axial tension test, flexure test, re-entry test, and torsion test, and/or one or more environmental tests: resistance to aggressive media test, resistance to stress cracking test, salt fog test, temperature cycling test, and waterhead test.

In certain embodiments, the sample is subjected to an axial tension test according to IEC 61300-2-4. In this test, the sample may be pressured internally at 20 kPa (0.2 atm) or 40 kPa (0.4 atm) at room temperature and sealed. The base assembly is clamped and a force is applied to each of the extending cables individually. If the sample has an outer diameter of less than or equal to 7 mm, then the amount of force per cable applied is equal to (outer diameter/45 mm)*500 Newtons ("N"). This force is applied for 15 minutes for each cable and built up to the IEC 61300-2-4 test. If the sample has an outer diameter of greater than 7 mm, then the amount of force per cable applied is equal to (outer diameter/45 mm)*1000 N, with a maximum of 1000 N applied. This force is applied for one hour. Internal pressure is then examined for pressure loss. In certain embodiments, the gel and cable are compatible if the pressure loss is less than 2 kPa (0.02 atm). In addition, in certain embodiments, the gel and cable are compatible if the displacement of the cable is less than 3 mm. In other embodiments, the specimens are further subjected to the tightness test, previously described.

In other embodiments, compatibility is measured by subjecting the sample to a flexure test according to IEC 61300-2-37. In this test, the samples are subjected to temperatures of −15° C. and 45° C. Samples are pressured internally at 20 kPa or 40 kPa (0.2 atm or 0.4 atm) and sealed. Cables are bent individually at an angle of 30° (or a maximum force application of 500 N) each side of neutral in the same plane. Each bending operation is held for 5 minutes. The cable is returned to its original position and then the procedure is repeated in the opposite direction. After 5 cycles on each cable, the samples are visually inspected by the naked eye for appearance, conditioned at room temperature, and subjected to a tightness test. In some embodiments, the gel and LSZH cable are compatible if the specimen passes the visual appearance test, pressure loss test (i.e., less than 2 kPa (0.02 atm)), and/or tightness test.

In another embodiment, compatibility is measured by subjecting the sample to a re-entry test according to IEC 61300-2-33. In certain embodiments, re-entry can be simulated after a certain time of temperature cycling. To complete this test, the closure has to be removed from the cycling room and tested on tightness. After this a reentry test can be done. In this test, a dummy plug or cable is removed from the closure and another cable or dummy plug is added. Then, tightness is measured again. Re-entry is successful if the closure passes the tightness test again.

Another mechanical test may be employed to determine compatibility. The sample may be subjected to a torsion test according to IEC 61300-2-5. After completion of the torsion test, the gel and cable may be considered compatible if the sample passes the visual inspection test, pressure loss test, and/or tightness test.

In yet other embodiments, compatibility is measured by conducting an environmental test of temperature cycling or accelerated aging under IEC 61300-2-22 and IEC 60068-2-14, Test Nb. In one embodiment, the temperature cycling test is conducted on the cable jacket between the gel blocks by cycling the temperature between −40° C. and 70° C. for 10 days at two cycles between the extreme temperatures per day. In some embodiments, the humidity is uncontrolled, the dwell time is four hours and the transition time is two hours. In certain embodiments, the cable jacket is tested for maintenance of tensile strength, ultimate elongation, tightness, visual appearance, and/or re-entry. Also, in certain embodiments, after the temperature cycling test, tightness of the closures needs to be tested after being conditioned to room temperature for a minimum of 2 hours. Therefore, in certain embodiments, the gel and LSZH cable are compatible if the specimen passes the tightness test.

In another embodiment, compatibility is determined by subjecting the sample to a resistance to aggressive media test under IEC 61300-2-34, ISO 1998/I, and EN 590. The sample is considered compatible if it subsequently passes the tightness and/or appearance test.

In yet another embodiment, compatibility is determined by subjecting the sample to a resistance to stress cracking test under IEC 61300-2-34. The sample is considered compatible if it subsequently passes the tightness test and/or shows no visible signs of cracking.

In other embodiments, compatibility is determined by subjecting the sample to a salt fog test under IEC 61300-2-36 and IEC 60068-2-11, Test Ka. The sample is considered compatible if it subsequently passes the tightness and/or appearance test.

In some embodiments, compatibility is determined by subjecting the sample to a waterhead test under IEC 61300-2-23, Method 2. The sample is considered compatible if there is no water ingress.

In certain embodiments, the dry silicone gel has measurable properties. For example, in some embodiments, the dry silicone gel has a hardness in the range of 26 to 53 Shore 000 Hardness, or 100 to 300 g, as measured according to methods known in the art. In certain embodiments, the shore hardness gauge is measured according to ISO868 or ASTM D2240. In other embodiments, hardness can be measured on a texture analyzer. For example, a LFRA Texture Analyzer-Brookfield may include a probe assembly fixed to a motor driven, bi-directional load cell. In such a system, the probe is driven vertically into the sample at a pre-set speed and to a pre-set depth. The hardness is the amount of force needed to push the probe into the test sample. In other embodiments, the dry silicone gel has a hardness in the range of 37 to 45 Shore 000, or 160 to 220 g. In yet other embodiments, the dry silicone gel has a hardness in the range of 38 to 42 Shore 000, or 170 to 200 g.

For further example, in some embodiments, the compression set, as measured after 50% strain is applied for 1000 hours at 70° C., has a range between 4% and 20%. In other embodiments, the compression set, as measured after 50% strain is applied for 1000 hours at 70° C., has a range between 10% and 14% when measured according to the modified version of ASTM D395, method B described above.

In some embodiments, the gel is compressed with a certain strain or deformation (e.g., in certain embodiments, to 50% of its original size). This causes a certain stress in the material. The stress is now reduced because the material relaxes. In certain embodiments, the stress relaxation of the dry silicone gel has a possible range between 30 and 60% when subjected to a tensile strain or deformation of about 50% of the gel's original size, wherein the stress relaxation is measured after a one minute hold time at 50% strain. In other embodiments, the stress relaxation of the dry silicone gel is between 40% and 60% when subjected to a tensile strain of about 50%. A higher stress relaxation indicates that once a gel is installed in a closure, the gel will require less stress in order for it to seal.

In certain embodiments, the dry silicone gel composition has less than 10% oil bleed out over a period of time when the gel is under compression of 120 kPa (1.2 atm) at 60° C. In certain embodiments, oil bleed out is measured on a wire mesh, wherein the oil loss may exit the gel through the mesh. The weight of the gel sample is recorded before and after the pressure has been applied. In some embodiments, the gel has less than 8% oil bleed out over the period of time. In other embodiments, the gel has less than 6% oil bleed out over the period of time. In certain embodiments, the oil loss is measured at 200 hours, 400 hours, 600 hours, 800 hours, 1000 hours, 1200 hours, or 1440 hours (60 days).

In certain embodiments, the dry silicone gel has less oil bleed out in comparison to a thermoplastic gel over the same period of time at 120 kPa (1.2 atm) at 60° C. In some embodiments, the dry silicone gel has 40%, 50%, or 60% oil bleed out than the thermoplastic gel at 200 hours, 400 hours, 600 hours, 800 hours, 1000 hours, 1200 hours, or 1440 hours (60 days).

EXAMPLES

Dry silicone gels were synthesized according to the following examples.

Example 1

A medium molecular weight telechelic vinyl-functional PDMS ($M_n$ 15,700) was reacted with tenfold excess ethane dithiol. The reaction was performed under irradiation in a reaction chamber fitted with ten 15 W 350 nm fluorescent UV-bulbs (blacklights) in the presence of 3 mg/ml 2,2-dimethoxy-2-phenylacetophenone (DMPA) under an argon atmosphere in a quartz irradiation vessel. Tetrahydrofuran (THF) was added to the point that the reaction-mixture became homogeneous. After irradiation for two hours, the THF was removed under vacuum and the excess ethane dithiol was removed by vacuum-stripping at 0.1 mm Hg and 100° C.

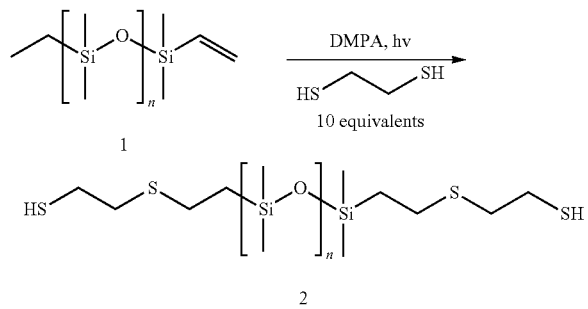

The dithiol was obtained as a colorless and almost odorless oil. GPC analysis showed a number average molecular weight $M_n$ of 28,800 and a polydispersity of 1.57. $^1$H-NMR showed the complete disappearance of the vinyl signals typical for vinyl-substituted PDMS. In order to assess the speed and efficiency of thiol-ene coupling of thiol and ene functional PDMS, the prepared dithiol was combined with the vinyl-substituted PDMS in different ratios with the addition of 1 mg/g of photo initiator (DMPA). During irradiation of 5 g aliquots in the previously described irradiation setup, the viscosity was measured as a function of irradiation time, using a Brookfield viscosimeter.

Figure 7:
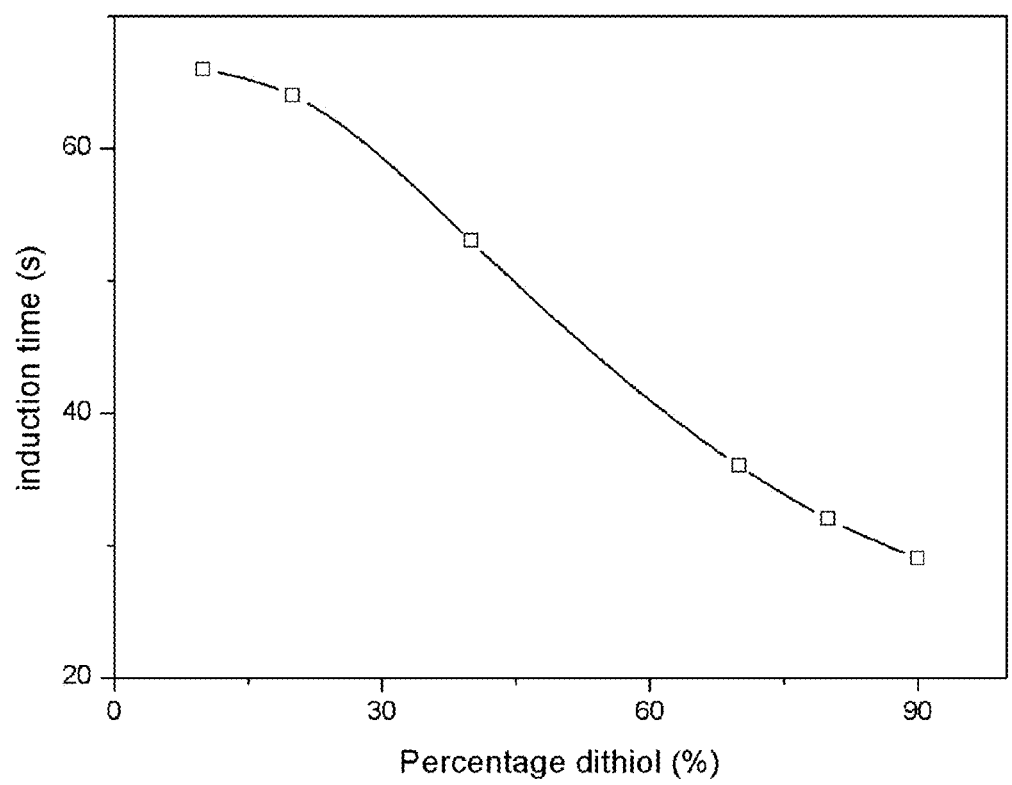
FIG. 7 is a depiction of induction time as a function of the percentage of dithio-functional PDMS.
Figure 8:
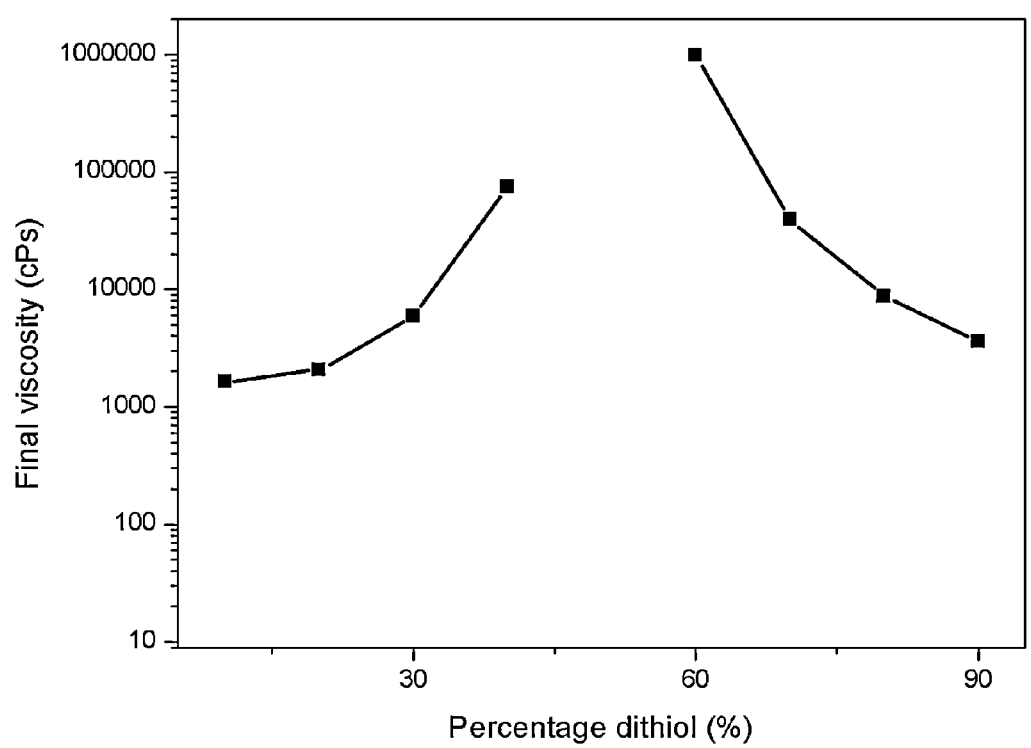
FIG. 8 is a depiction of the final viscosity of the dry silicone gel as a function of the percentage of dithio-functional PDMS.
Figure 9:
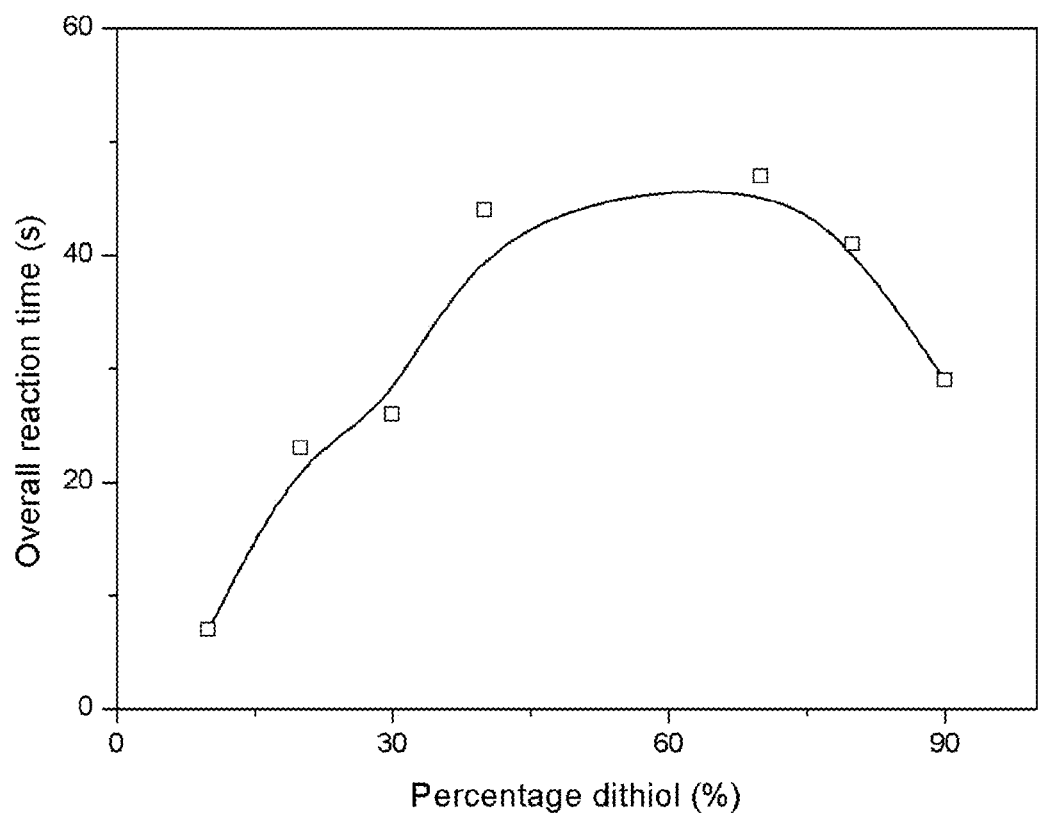
FIG. 9 is a depiction of the overall reaction time as a function of the percentage of dithio-functional PDMS.

The thiol-ene PDMS chain-extension reaction shows a decrease in induction time with an increase in dithiol content (FIG. 7). Dissolved oxygen, which acts as an inhibitor by converting carbon-centered radicals into peroxy-radicals, is probably consumed at a faster rate with increased thiol concentration due to transfer from the peroxy-radical to the thiol, which re-activates the "dead" peroxy-radical, thus increasing the overall concentration of radicals and thereby the consumption of oxygen. The viscosity of the final product obtained after photo polymerization highly depends on the ratio of thiol to ene functional PDMS, as can be expected for an efficient linking reaction (FIG. 8). At a 1:1 ratio (50% dithiol) the viscosity of the final product was so high that it could not be measured with the applied Brookfield viscosimeter (upper-limit of $2.2 \times 10^6$ cPs). However at this 1:1 ratio, the maximum measurable viscosity translates into an approximate minimum reached molecular weight $M_n$ of 190,000, using the Barry's equation, which means that on average at least 12 PDMS units of $M_n$ 15,700 were linked to a single chain. In FIG. 9, the overall reaction time, measured for the different thiol to ene ratios, shows a maximum of around 50 seconds at 50% dithiol content, while the off-equimolar ratio's all show faster reactions. The increasingly high molecular weight that is reached, when approaching equimolar conditions, will lead to an increase in viscosity (as shown in FIG. 8) and therefore a decrease in mobility of the polymer chains. Low chain-mobility will slow down the reaction leading to a longer overall reaction time. In addition, non-equimolar conditions means that one of the two reactants is in excess, increasing the reaction rate (provided the reaction rate is dependent on both the thiol and ene concentration).

As was shown with linear thiol and ene functional PDMS, photo-initiated thiol-ene chemistry can be applied to efficiently link different PDMS molecules. A logical extension to the concept is to use of a multifunctional thiol, leading to a crosslinked network instead of just higher molecular weight PDMS. In table 1 the molecular weights of the different vinyl functional and thiol functional PDMS materials are given. The values were obtained by triple-detection GPC, which combines a refractive-index detector with an online viscosimeter and a light scatter detector. Using this combination of three detectors, an absolute value for $M_n$ and $M_w$ can be obtained, without the need for calibration standards. The obtained $M_n$ values significantly deviate from the $M_n$ values provided by the suppliers. In addition the polydispersity can vary to quite a large extent (between 1.5 and 2.5). In order to keep the variability within the experiments as low as possible just one batch of thiol-functional PDMS was used for all further experiments. Thiol content was determined by $^1$H NMR. For all thiol functional PDMS a similar thiol content (3.9-4.2 mol %) was found.

Initially only molecular weight data as provided by the supplier was available. This data was therefore used to calculate the optimal ratios of the thiol-functional PDMS to the other vinyl functional PDMS components, later the true molecular weights were used to correct the previously used results.

TABLE 1

Absolute molecular weight and polydispersity of the PDMS-based polymers, obtained by triple detection-GPC. Bold numbers denote materials used in this study, other numbers were used as reference

|  | $M_n$ (g/mol) indicated by supplier | $M_n$ (g/mol) | $M_w$ (g/mol) | Polydispersity (PDI) | thiol content (mol %) indicated by supplier | thiol content (mol %) (from NMR) |
|---|---|---|---|---|---|---|
| 1000 cSt vinyl PDMS (1) | 28000 | 15700 | 39200 | 2.49 | — | — |
| 5000 cSt vinyl PDMS (2) | 49500 | 52100 | 85000 | 1.63 | — | — |
| 10000 cSt vinyl PDMS (3) | 62700 | 61900 | 98500 | 1.59 | — | — |
| Thiol-functional PDMS (4) | 6000-8000 | 6800 | 18800 | 2.76 | 4-6 | 3.86 |

TABLE 1-continued

Absolute molecular weight and polydispersity of the PDMS-based polymers, obtained by triple detection-GPC. Bold numbers denote materials used in this study, other numbers were used as reference

| | $M_n$ (g/mol) indicated by supplier | $M_n$ (g/mol) | $M_w$ (g/mol) | Polydispersity (PDI) | thiol content (mol %) indicated by supplier | thiol content (mol %) (from NMR) |
|---|---|---|---|---|---|---|
| Thiol-functional PDMS (5) | 6000-8000 | 9770 | 19700 | 2.07 | 4-6 | 3.86 |
| Thiol-functional PDMS (6) | 6000-8000 | 8570 | 18600 | 2.17 | 4-6 | 3.87 |
| Thiol-functional PDMS (7) | 6000-8000 | 16200 | 32000 | 1.97 | 4-6 | 4.25 |

Example 2

In this example, a multi thiol functional PDMS was formed using a ratio of thiol to ene of 0.58, which translates to a 1:1 ratio when the suppliers data is used. This means that the formulations will be slightly under-cured due to the relatively low amount of crosslinker. Cured samples were subsequently subjected to a tensile test to establish the relationship between the amount of silica (surface-modified fumed silica, Degussa R9200), the strain at break, and the elastic modulus.

Figure 10:
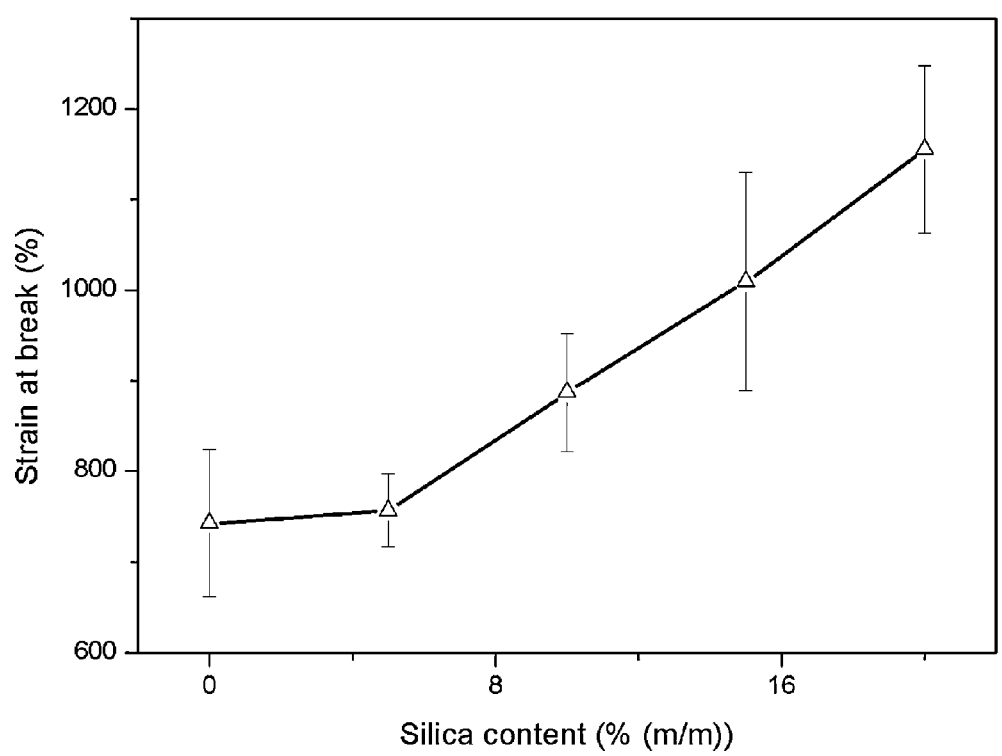
FIGS. 10 and 11 are depictions of the strain at break and the initial elastic modulus as a function of silica content for telechelic vinyl PDMS ($M_n$ 52100) with 0.58 equivalents of multi thiol functional PDMS. The error-bars represent the 90% confidence interval.
Figure 11:
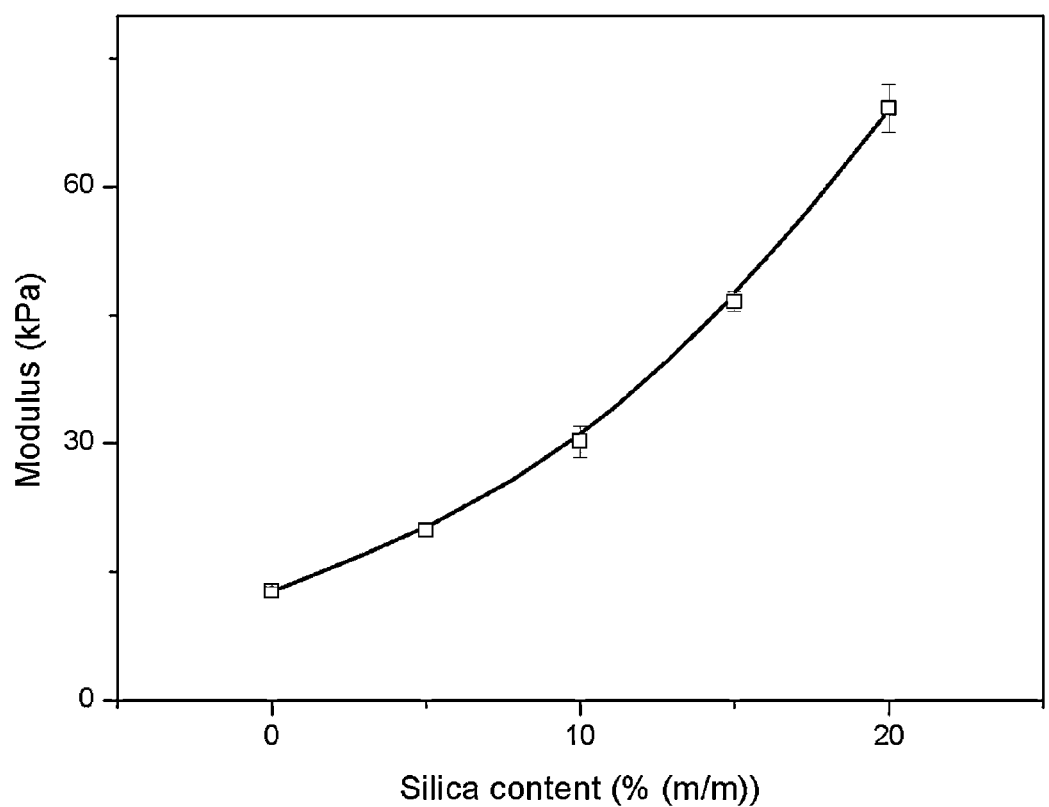

Addition of silica increases the strain at break significantly. The increase is almost linear with the amount of silica added. However, this increase is only significant when more than 5% m/m is added (FIG. 10). In addition to the increase in strain at break, an increase in elastic modulus is observed as well (FIG. 11).

Since a significant increase in elastic modulus is undesirable, and an increase in strain at break is very important for the final application (cable-enclosures), a trade-off needs to be made between strain at break and modulus. In certain embodiments, 10 wt % of silica seems to combine a reasonable value for both (~900% strain and ~30 kPa E-modulus). Therefore, 10 wt % of silica was added in all additional experiments.

Example 3

In order to assess the influence of the thiol to ene ratio and the molecular weight on the Gel properties, a series of cured samples, using different thiol to ene ratios and different molecular weight telechelic vinyl functional PDMS, was prepared and subjected to a tensile test.

Figure 12:
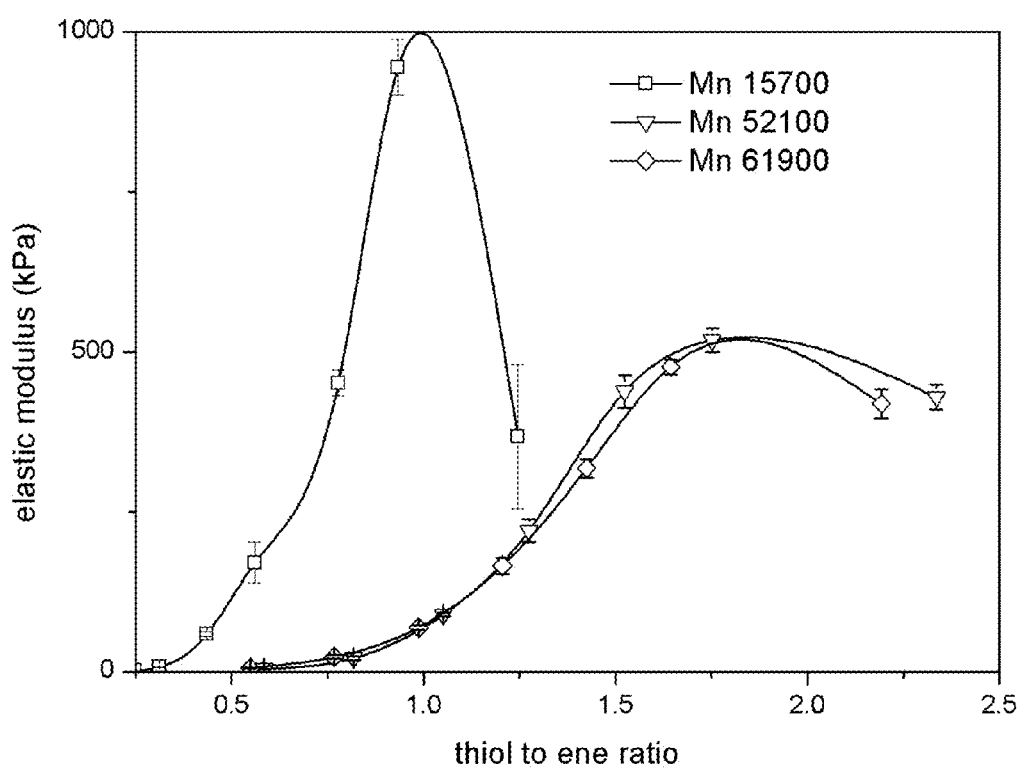
FIG. 12 is a depiction of an elastic moduli of the networks formed from telechelic vinyl PDMS of different molecular weight and thiol functional PDMS as a function of the molar thiol to ene ratio used to prepare the networks. The error bars represent the 90% confidence interval.

The moduli vary strongly with the thiol to ene ratios (FIG. 12). For the lowest molecular weight vinyl PDMS, a maximum in the E-modulus is found at a ratio of 1, which corresponds to the stoichiometric ratio. However, for the two higher molecular weight PDMS-materials, this ratio is closer to 1.7, which indicates that not all ene is able to react with the thiol.

Figure 13:
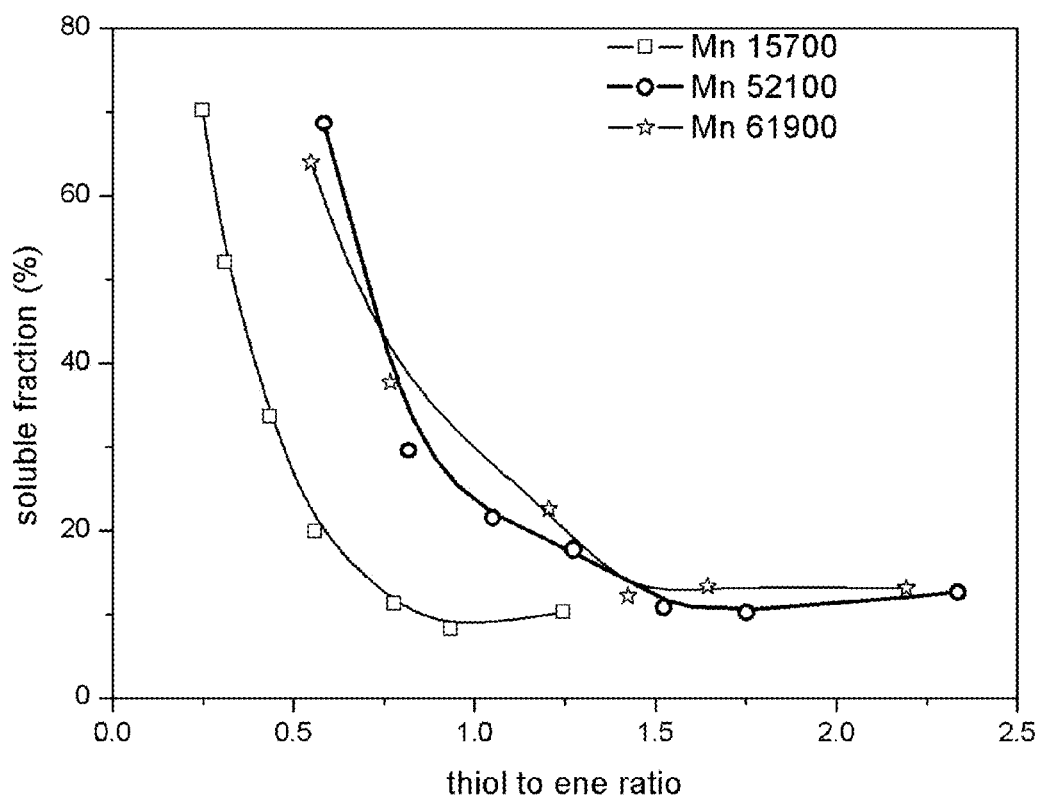
FIG. 13 is a depiction of the pentane-soluble fraction of the networks formed from telechelic vinyl PDMS ($M_n$ 61900) and thiol functional PDMS as a function of the molar thiol to ene ratio used to prepare the networks.

Apart from the molecular weight, the difference in polydispersity of the lower molecular weight vinyl PDMS sample could play a role in this obvious difference in curing behavior. The presence of low molecular weight material in this high polydispersity sample will make it easier to have full conversion at a 1:1 thiol to ene ratio due to the reduction of sterical and mobility restrictions that will be more of influence in the more mono disperse and higher molecular weight samples. The amount of extractable material (pentane soluble fraction) per unit of cured material (FIG. 13) follows a similar trend as compared to the elastic modulus data in FIG. 12. The low molecular weight vinyl PDMS shows a minimum in extractable material at a thiol to ene ratio of 1, while the higher molecular weight samples show a minimum at a ratio of 1.5.

Figure 14:
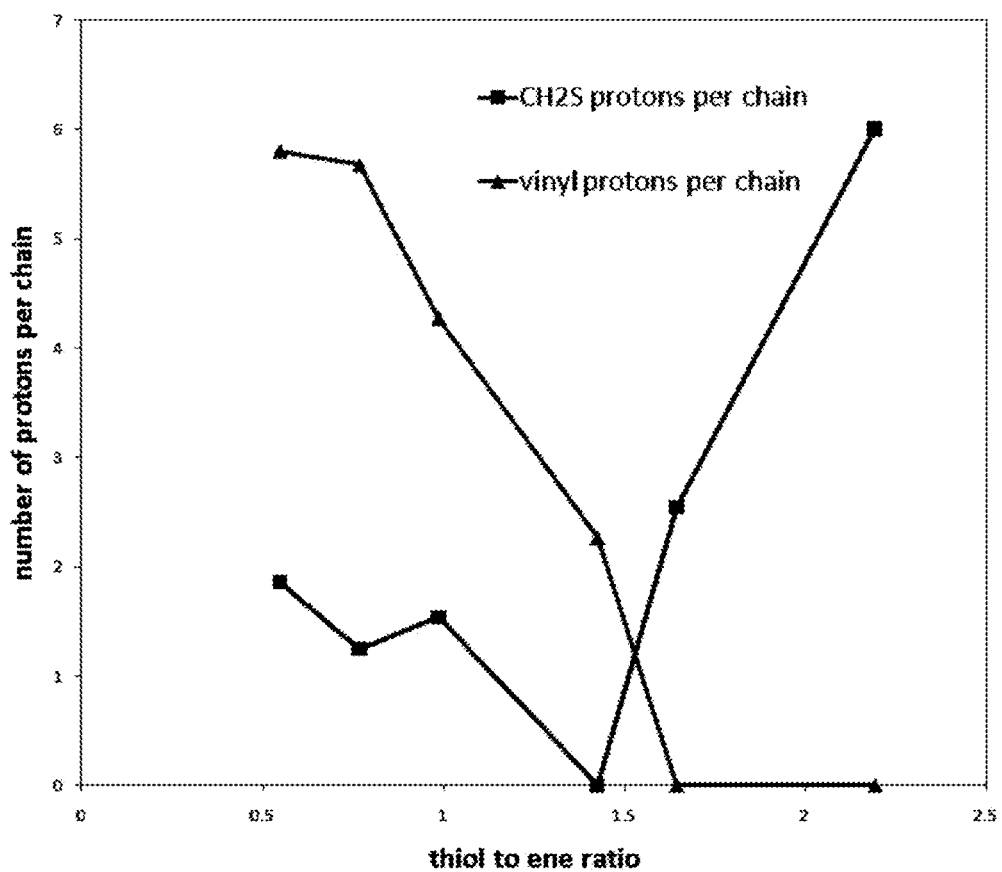
FIG. 14 is a depiction of the number of alpha thio-methylene protons ($CH_2S$; thiol or thioether, squares) and vinyl protons (triangles) per 5000 $SiCH_3$ protons (the average number of methyl protons per vinyl-PDMS as calculated from the triple-detection GPC-data of 3) as a function of the molar thiol to ene ratio used to prepare the networks.

Although the maximum in E-modulus and the minimum in the extractable material (pentane soluble fraction) per unit of cured material are at a similar value of thiol to ene ratio, there is a small but significant difference for the higher molecular weight samples (1.7 versus 1.5). It is therefore interesting to have a closer look at the highest molecular weight sample with regard to the identity of the extracted material using NMR characterization. Two different sets of protons are of significance in the characterization of the extracted material; the unsaturated vinyl protons and the alpha thio methylene units in both the thiol and the thio-ether moieties. In FIG. 14, the number of protons (normalized to the number of protons present on average in a single vinyl PDMS molecule) of each set are plotted as a function of the thiol to ene ratio. The vinyl protons decrease in intensity with an increasing thiol to ene ratio. At a ratio of 1.6 the number has become equal to zero. The thiol/thioether signal on the other hand first decreases to zero at a ratio of 1.4 and increases steeply at higher ratios.

The highest modulus is to be expected for the most dense network, i.e. a network with as little dangling ends and uncured vinyl-silicone (the highest molecular weight component). From the NMR data it is clear that an optimum in vinyl-cure is only reached at a thiol to ene ratio of at least 1.6. The extraction data shows that there is hardly any increase in extractable fraction beyond a thiol to ene ratio of 1.5, while the NMR thiol/thioether signal steadily increases beyond this point. This means that the beyond a ratio of 1.5 the main extractable material becomes thiol-functional PDMS and oligomers thereof.

The dry silicone gels may be tested in a number of ways, such as: temperature cycling, re-entry test, French water cycling, cold and hot installations, and kerosene exposure. For temperature cycling experiments, closures including dry silicone gels are exposed to temperatures between −30° C. and +60° C. for 10 days. Humidity is typically not controlled.

The closures are cycled between the high and low temperatures two times a day for ten days. Samples are maintained at the extreme temperatures for four hours during each cycle.

For combined temperature cycling tests, dry silicone gels are installed in three closure systems. After installation, the closures are tested on tightness and put into temperature cycling. After eight days, a re-entry test is performed, and after ten days, the closures are taken out of cycling and tested on tightness and re-entry. Closures containing the standard thermoplastic gels are also tested.

For tightness testing, the closure is immersed in a water bath for 15 minutes and an internal pressure of 20 kPa. If air bubbles are observed, this means the closure is not properly sealed and it will be considered as a failure.

For re-entry testing, a dummy plug or cable is removed from the closure and another cable or dummy plug is added. Then, tightness is measured again. Re-entry is successful if the closure passes the tightness test again.

In certain embodiments, the dry silicone gel in the closure system may be able to pass the tightness and re-entry tests where a traditional thermoplastic elastomer gel would fail.

Although examples have been described herein, it should be appreciated that any subsequent arrangement designed to achieve the same or similar purpose may be substituted for the specific examples shown. This disclosure is intended to cover any and all subsequent adaptations or variations of various examples. Combinations of the above examples, and other examples not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single example for the purpose of streamlining the disclosure. This disclosure is not to be interpreted as reflecting an intention that the claimed examples require more features than are expressly recited in each claim. Rather, as the following claims reflect, inventive subject matter may be directed to less than all of the features of any of the disclosed examples. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other examples, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A method of making a dry silicone gel by thiol-ene chemistry, comprising:
    providing a base polymer having a vinyl-silicone group, a crosslinker having thiol groups, and an initiator;
    providing heat or ultraviolet light; and
    reacting the base polymer and crosslinker in the presence of the initiator to form the dry silicone gel, wherein the dry silicone gel comprises one or more of the following properties:
    a) a Shore 000 hardness between 100 g and 300 g;
    b) a stress relaxation between 40% and 60% when the gel is subjected to a deformation of 50% of its original size;
    c) a compression set between 4% and 20% after 50% strain has applied to the gel for 1000 hours at 70° C.; and
    d) less than 10% oil bleed out after being under compression of 1.2 atm for 60 days at 60° C.

2. The method of claim 1, further comprising providing a chain extender having thiol groups.

3. The method of claim 2, wherein the chain extender is a thiol end-capped polydimethylsiloxane (PDMS) or a thiofunctional telechelic PDMS.

4. The method of claim 1, wherein the initiator is a photoinitiator.

5. The method of claim 4, wherein the photoinitiator is selected from the group consisting of: acetophenone, anisoin, anthraquinone, benzil, benzoin, benzoin ethyl ether, benzoin isobutyl ether, benzoin methyl ether, benzophenone, benzophenone/1-hydroxycyclohexyl phenyl ketone, 3,3',4,4'-benzophenonetetracarboxylic dianhydride, benzoylbiphenyl, 2-benzyl-2-(dimethylamino)-4'-morpholinobutyrophenone, 4,4'-bis(diethylamino)benzophenone, 4,4'-bis(dimethylamino)benzophenone, camphorquinone, 2-chlorothioxanthen-9-one, dibenzosuberenone, 2,2-diethoxyacetophenone, 4,4'-dihydroxybenzophenone, 2,2-dimethoxy-2-phenylaceto-phenone, 4-(dimethylamino)benzophenone, 4,4'-dimethylbenzil, 2,5-dimethylbenzophenone, 3,4-dimethylbenzophenone, diphenyl(2,4,6-trimethylbenzoyl)phosphine oxide/2-hydroxy-2-methylpropiophenone, 4'-ethoxyacetophenone, 2-ethylanthraquinone, 3 3'-hydroxyacetophenone, 4 4'-hydroxyacetophenone, 3-hydroxybenzophenone, 4-hydroxybenzophenone, 1-hydroxycyclohexyl phenyl ketone, 2-hydroxy-2-methylpropiophenone, 2-methylbenzophenone, 3-methylbenzophenone, methybenzoylformate, 2-methyl-4'-(methylthio)-2-morpholinopropiophenone, phenanthrenequinone, 4'-phenoxyacetophenone, and thioxanthen-9-one, and mixtures thereof.

6. The method of claim 1, wherein the initiator is a thermal initiator.

7. The method of claim 6, wherein the thermal initiator is a peroxide or azo-compound.

8. The method of claim 7, wherein the thermal initiator is selected from the group consisting of 2,2'-azobisisobutyronitrile (AIBN), cyclohexyl analogs of AIBN, 2,2'-azobis(4-methoxy-2,4-dimethyl valeronitrile), and mixtures thereof.

9. The method of claim 1, further comprising providing at least one additive selected from the group consisting of: flame retardants, coloring agents, adhesion promoters, stabilizers, fillers, dispersants, flow improvers, plasticizers, slip agents, toughening agents, and combinations thereof.

10. The method of claim 1, further comprising providing between 0.1 wt % and 30 wt % of a toughening agent.

11. The method of claim 10, wherein the toughening agent is a fumed silica.

12. The method of claim 1, wherein the crosslinker is a polydimethylsiloxane copolymer having a thiol content between 0.1 mmol/g and 10 mmol/g and a molecular weight between 2,000 g/mol and 20,000 g/mol.

13. The method of claim 1, wherein the base polymer comprises a vinyl-terminated polydimethylsiloxane.

14. The method of claim 1, wherein the base polymer has one or more of the following properties:
    a) a molecular weight between 5,000 g/mol and 70,000 g/mol;
    b) a viscosity between 100 mm$^2$/s and 165,000 mm$^2$/s; and
    c) a vinyl content between 0.01 mmol/g and 0.1 mmol/g.

15. A closure or interconnect system, comprising:
    a housing,
    a cable, and
    a dry silicone gel comprising a thioether, wherein the dry silicone gel is made by a method comprising reacting:

a crosslinker having thiol groups, and
a base polymer having a vinyl-silicone group,
wherein the crosslinker and base polymer are combined in the presence of an initiator by a thiol-ene chemistry reaction mechanism.

16. The system of claim 15, wherein the method for making the dry silicone gel further comprises adding a chain extender having thiol groups to the crosslinker and the base polymer in the reacting step.

17. The system of claim 15, wherein the dry silicone gel is compatible with a low smoke zero halogen (LSZH) cable as determined by a pressure loss test or tightness test following at least one of the following mechanical or environmental tests: axial tension test, flexure test, re-entry test, torsion test, resistance to aggressive media test, resistance to stress cracking test, salt fog test, temperature cycling test, and waterhead test.

18. The system of claim 15, further comprising a connector and a receptacle for the connector.

19. The system of claim 15, wherein the dry silicone gel has a Shore 000 hardness from 160 g to 220 g.

20. The system of claim 15, wherein the dry silicone gel has an original size and a stress relaxation of between 40% to 60% when subjected to a deformation of 50% of the original size.

21. The system of claim 15, wherein the dry silicone gel has a compression set of between 4% to 20% after 50% strain has applied to the gel for 1000 hours at 70° C.

22. The system of claim 15, wherein the dry silicone gel has a compression set of between 10% to 14% after 50% strain has applied to the gel for 1000 hours at 70° C.

23. The closure or interconnect system of claim 15, wherein the method of making the dry silicone gel comprises:
providing a composition comprising
the base polymer as a vinyl-terminated polydimethylsiloxane having a molecular weight between 28,000 g/mol and 70,000 g/mol, a viscosity between 3,000 mm$^2$/s and 7,000 mm$^2$/s, and a vinyl content between 0.01 mmol/g and 0.1 mmol/g;
the crosslinker as a polydimethylsiloxane copolymer crosslinker having a thiol content between 0.1 mmol/g and 10 mmol/g and a molecular weight between 2,000 g/mol and 20,000 g/mol;
a chain extender;
a photo or thermal initiator; and
a fumed silica hardening agent;
providing heat or ultraviolet light; and
reacting the base polymer, crosslinker, and chain extender in the presence of the initiator to form the dry silicone.

24. The closure or interconnect system of claim 15, wherein the dry silicone gel is prepared from a composition comprising:
45-99.99 wt % of the base polymer having a vinyl-silicone group;
0.01-5 wt % of the crosslinker having thiol groups; and
0-50 wt % of a chain extender having thiol groups.

25. The closure or interconnect system of claim 24, wherein the composition comprises 90-99.99 wt % of the base polymer, 0.01-5 wt % of the crosslinker, and 0.01-5 wt % of the chain extender.

26. The closure or interconnect system of claim 24, wherein the composition further comprises at least one additive selected from the group consisting of: flame retardants, coloring agents, adhesion promoters, stabilizers, fillers, dispersants, flow improvers, plasticizers, slip agents, toughening agents, and combinations thereof.

27. The closure or interconnect system of claim 26, wherein the composition further comprises between 0.1 wt % and 30 wt % of a toughening agent.

28. The closure or interconnect system of claim 27, wherein the toughening agent is a fumed silica.

29. The closure or interconnect system of claim 24, wherein the base polymer is a vinyl-terminated polydimethylsiloxane.

30. The closure or interconnect system of claim 24, wherein the crosslinker is a (mercaptopropyl)methylsiloxane-dimethylsiloxane copolymer having a thiol content between 0.1 mmol/g and 10 mmol/g and a molecular weight between 2,000 g/mol and 20,000 g/mol.

31. The closure or interconnect system of claim 24, wherein the chain extender is a thiol end-capped polydimethylsiloxane (PDMS) or a thio-functional telechelic PDMS.

32. The closure or interconnect system of claim 24, wherein the base polymer has one or more of the following properties:
a) a molecular weight between 5,000 g/mol and 70,000 g/mol;
b) a viscosity between 100 mm$^2$/s and 165,000 mm$^2$/s; and
c) a vinyl content between 0.01 mmol/g and 0.1 mmol/g.

33. The closure or interconnect system of claim 24, wherein the dry silicone gel comprises one or more of the following properties:
a) a Shore 000 hardness between 100 g and 300 g;
b) a stress relaxation between 40% and 60% when the gel is subjected to a deformation of 50% of its original size;
c) a compression set between 4% and 20% after 50% strain has applied to the gel for 1000 hours at 70° C.; and
d) less than 10% oil bleed out after being under compression of 1.2 atm for 60 days at 60° C.

* * * * *